Feb. 2, 1971  W. A. MUELLER  3,560,365
CORROSION PROTECTION OF PIPELINES
Filed July 12, 1967  4 Sheets-Sheet 3

Inventor
Walter Adolf Mueller
By Cushman, Darby & Cushman
Attorneys

Feb. 2, 1971 W. A. MUELLER 3,560,365
CORROSION PROTECTION OF PIPELINES
Filed July 12, 1967 4 Sheets-Sheet 4
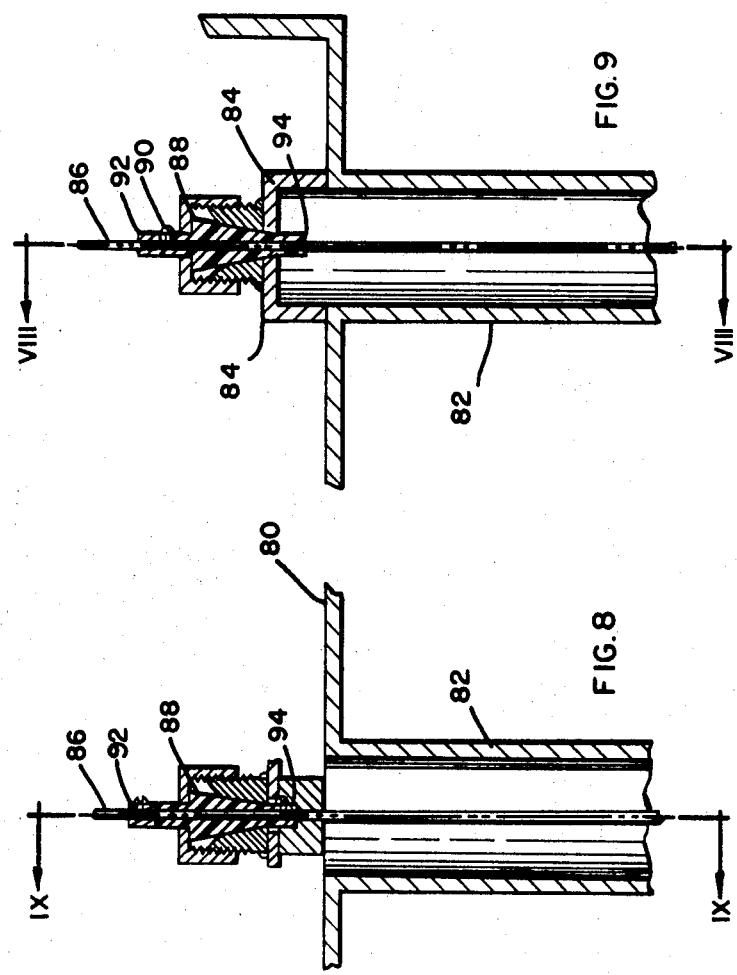

United States Patent Office 3,560,365
Patented Feb. 2, 1971

3,560,365
CORROSION PROTECTION OF PIPELINES
Walter Adolf Mueller, Dorval, Quebec, Canada, assignor to Pulp and Paper Research Institute of Canada, Pointe Claire, Quebec, Canada, a nonprofit corporation of Canada
Filed July 12, 1967, Ser. No. 652,843
Int. Cl. C23f *13/00*
U.S. Cl. 204—196                              7 Claims

ABSTRACT OF THE DISCLOSURE

An apparatus for protecting long pipe lines against corrosion consisting of a conductor wire or rod inside the pipe, the diameters of pipe and rod being dependent upon the materials used and the liquid to be conveyed. In some cases where the throwing power of the protection is weak special arrangements are shown to protect the pipe line round bends and right up to gates of valves and pump impellers.

---

This invention relates to the corrosion protection of the inside of pipelines by anodic or cathodic impressed currents.

Since corrosive liquids are used extensively in a great variety of industrial plants, the attack by these liquids on the inside of pipelines, pumps and valves causes a great amount of damage and often unforeseen interruption of production. Anodic or cathodic protection can often be used for the protection of metals and alloys if an economic arrangement for the supply of current can be made. This protection permits substitution of expensive materials, such as stainless steels, by less expensive materials, such as mild steel. Also, the thickness of the container material can be decreased if the allowance for the corrosion can be reduced by anodic or cathodic protection.

The throwing power of either anodic or cathodic protection is isufficient to protect extended pipelines by the supply of current to adjoined containers, as has been proposed previously. Similarly both impressed current and sacrificial anodes suspended locally inside pipelines are not always practical. The throwing power of either anodic or cathodic protection decides the number of electrodes required. If it is low, a great number of locally suspended electrodes are to be applied, thus increasing the cost of the arrangement. For instance, the maximum spread between anodes in bare steel pipes of twelve-inch diameter, carrying sea-water, which has an excellent ionic conductivity, is seven pipe diameters, i.e. seven feet. For liquids with a lower conductivity the available spread is smaller. If the electrochemical behaviour of the fluid varies with composition and time all the possibly maintained fluid compositions have to be considered in the selection of the spread between electrodes which can make this arrangement rather impractical. Sacrificial anodes, as for instance zinc welded to the inside throughout the pipeline, are inferior to electrodes for impressed current that can serve as permanent installations. It will be understood that by "elongated pipe," considerable length of pipe" and similar expressions we mean "much longer than the throwing power." For sea-water this might be in the order of twenty pipe diameters or more but for liquids of lesser conductivity in other pipe materials the same terms would mean a shorter actual length in pipe diameters.

It is an object of this invention to enable considerable lengths of piping to be economically protected against corrosion.

It is another object of this invention to enable protection to be extended for pipe work bends, curves, valves and pumps, and includes systems where the throwing power of protection is limited.

It is another object of this invention to reduce maintenance of pipelines.

It is a further object of this invention to provide protection for complete kraft mill liquor circuits including the pipes for conveying green, black and white liquors when combined with known prior art protection of digesters.

It is yet another object of this invention to reduce the capital cost of pipelines by enabling thinner wall sections or less expensive materials, e.g. mild steel instead of stainless steel, to be used consequent upon the reduction or elimination of the necessity for considering the weakening effect of corrosion.

The invention may best be understood by referring to the attached drawings in which:

FIG. 8 shows a cross-section of an insulated suspension at an exit of a liquor tank;

FIG. 9 is a cross-sectional view of the embodiment of FIG. 8; and

Figure 1:
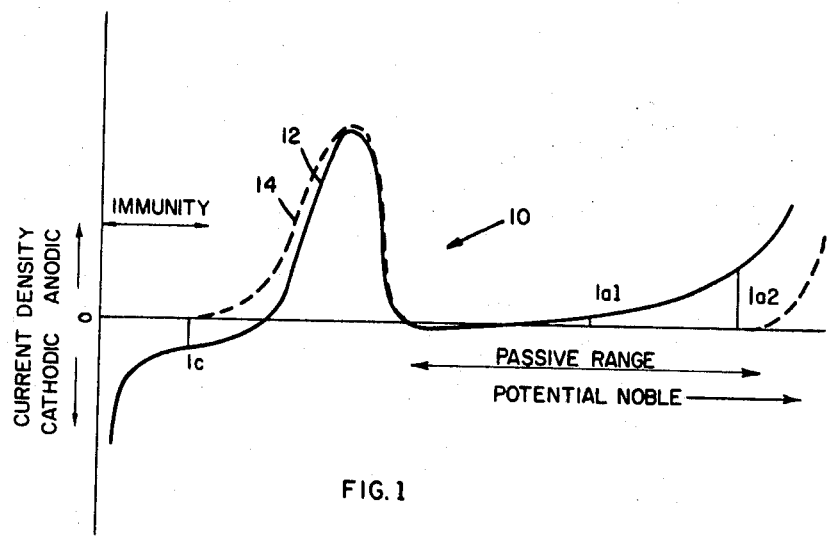
FIG. 1 illustrates anodic dissolution curve and polarization curve of iron in white liquor containing some polysulphide.

Referring now to FIG. 1, the dotted line 14 indicates that part of the current density which is due to dissolving metal which is to say that it represents the corrosive power. The full curve 12 shows that potentiostatic polarization curve, that is to say it shows the current density at the metal surface as a function of the metal-electrolyte potential difference. It also shows the cathodic current density illustrated at $Ic$ at which the iron no longer dissolves appreciably and the anodic current densities $Ia1$ and $Ia2$ in the passive range.

There are conditions for which the same material, e.g. mild steel in kraft liquor, can be used for anodic and cathodic protection. In numerous other cases very different materials may be used with advantage as electrode. Except for the cost of the wire the deciding data are contained in the polarization curves as discussed below.

For the calculation of the current densities the high ratio of the area of the inner surface of the pipe to be protected to that of the wire used as electrode has to be considered. The total current transfer on the inner pipe surface equals that on the counterelectrode, the directions of the currents (metal-electrolyte) being opposite. Thus the current densities become inversely proportional to the extension of the exposed surface areas. When the wire electrode is used as cathode and when the current density $Ic$ is applied to it, the corresponding anodic current density on the pipe surface in the passive state $Ia1$ is related to $Ic$ by $$Ia1:Ic = d:D \tag{1}$$

where $d$ = external diameter of the wire electrode and
$D$ = internal diameter of the pipe, the exposed areas being equal to the product (pipe length) $\times \pi d$ and (pipe length) $\times \pi D$, respectively. This is the relation for anodic protection of the pipe. For cathodic protection of the pipe, however, the relation is just reversed. In this case $Ic$, the current density to be maintained at the pipe surface, and the current density ($Ia2$) at the wire, which is the anode, follow the relation:

$$Ia2:Ic = D:d \qquad (2)$$

At the values of the polarization and anodic dissolution curves given in FIG. 1, anodic protection of the pipeline requires less potential and considerably less current than cathodic protection and it provides cathodic protection to the electrode. Conditions under which cathodic protection becomes more favourable are demonstrated by FIG. 2. In this case $Ic$ is smaller than any $Ia2$ values in the passive range, i.e. cathodic protection to the pipeline requires much less current than anodic protection. When the current is adjusted to the correct value, the potentials shift until either Equation 1 for anodic or Equation 2 for cathodic protection apply.

It will be appreciated that the cathodic current density cannot be increased unduly since this gives rise to hydrogen generation and is consequently both less efficient and may cause hydrogen embrittlement.

Figure 3:
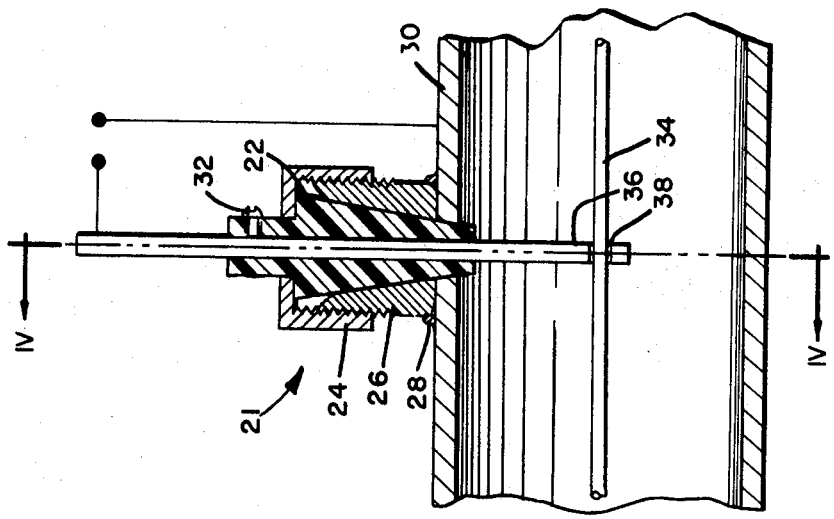
FIG. 3 is a sectional elevation through the pipe showing an insulation suspension for an axially extended electrode.
Figure 4:
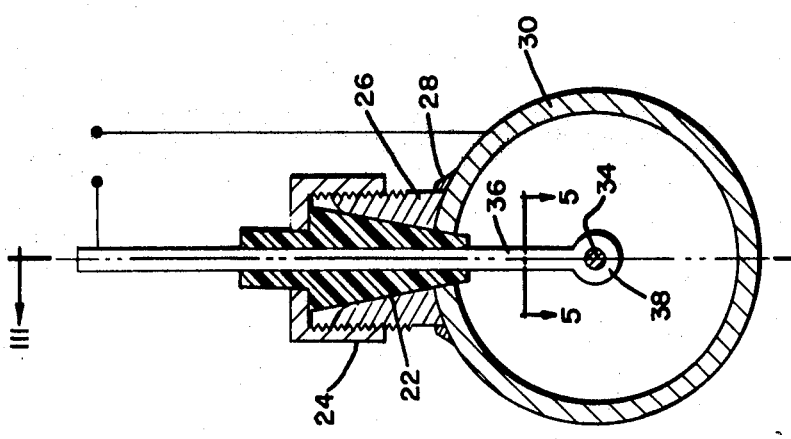
FIG. 4 is a sectional elevation of FIG. 3.

FIGS. 3 and 4 show cross-sections through a pipeline with an arrangement for wire suspension. The arrangement generally indicated at 21 shows an insulating bushing 22 trapped between screw cap 24 and half nipple 26 attached by the weld 28 to the pipeline 30. As a material for the insulating bushing 22, rubber or plastics may be used depending on the resistance of these materials to the fluid to be conveyed. For kraft mill liquors, "Teflon" is a much preferred material. "Teflon" is a trademark for polytetrafluoroethylene. A screw 32 is used to maintain a supporting member 36 at a predetermined height so that the wire or rod 34 may be supported by a perforation at the wide end 38 of the support member 36.

Figure 5:
FIG. 5 shows a cross-section of suspension of FIG. 3.

FIG. 5 shows the preferred cross-section 40 of the support bar 36 suitably faired to avoid undue losses in rapid or turbulent flow.

Figure 6:
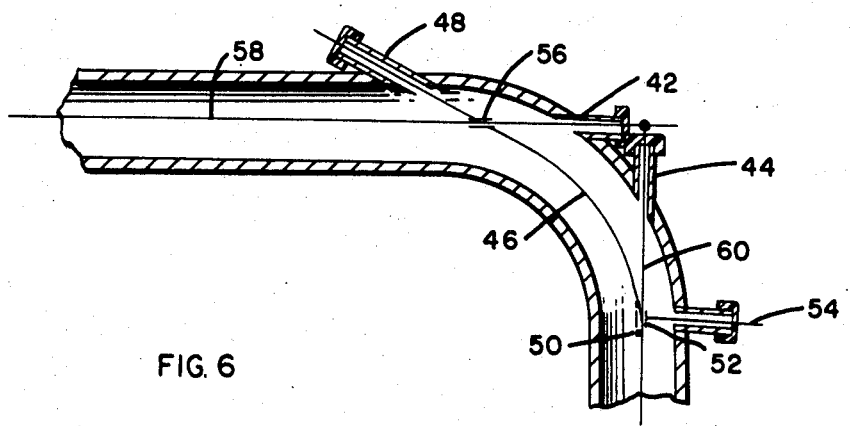
FIG. 6 shows an adoption of an embodiment suitably suspending an electrode around a curve.

FIG. 6 shows how an electrode wire can be fed into a pipeline from a curve using the suspension explained in FIGS. 3 and 4. Two half nipples 42 and 44 may be welded to the curve under an inclination so as to permit straight suspension of the wires 58 and 60. If the throwing power of the protection be fairly limited and the curve be through 90° or more a special wire 46 may be used that is fed into the pipeline through a half nipple 48 and arrested in the axial position by increasing its cross-section 50 at either side of a tube section 52 which is attached to the support 54. Another short pipe section or ring 56 is welded into wire 46 to provide another support for wire 58. It will be understood by those skilled in the art that the conductor wires or their supports do not contact the half nipples and that in each case an insulating bushing arrangement may be of the type shown in FIGS. 3 and 4.

Figure 7:
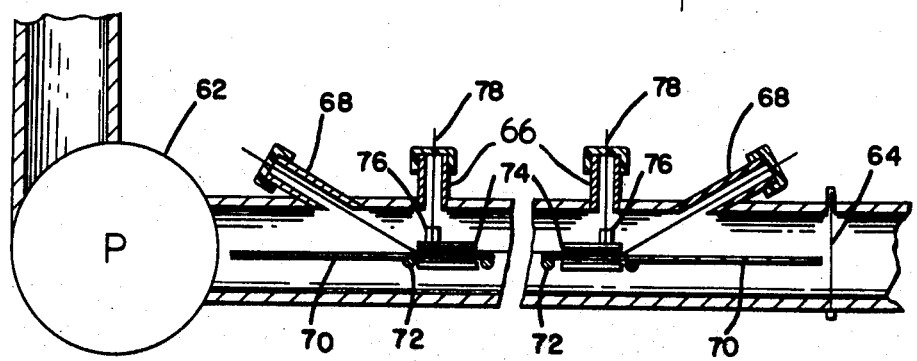
FIG. 7 shows an insulated suspension for protecting a pump and valve.

FIG. 7 shows the application of an embodiment of the invention to a straight pipe section with a pump and a valve. End supports in a straight section of a pipeline are required close to pump 62 or valve 64, which obviously do not permit traversal by a wire. In very extended pipelines and for rapid liquid flow the accumulated effect of liquid friction causes a considerable pull on the suspended wire. Hence end-support is required within straight sections when the length of wire sections surpasses certain values. For this purpose a combination of a straight half nipple 66, and an inclined half nipple 68, each with an insulating cap or bushing is used at each end support. A rod 70 is extended from the joint or wire and suspension on the axis close to the valve or pump, and this rod is longitudinally retained by local radial protrusions 72 produced by local flattening, build up by welding or similar means on either side of the tube sections 74. An internally threaded boss 76 welded to one end of tube section 74 is used as connection to the supporting bars 78. This arrangement is required particularly when the throwing power is low since the rod 70 may extend beyond the pipe-to-pump or pipe-to-valve joint and right up the entry of the pump or valve, or any other similar flow control means.

FIGS. 8 and 9 represent cross-sectional views of another end support at the exit from a tank 80 into a pipeline 82. It is carried by a support 84 (which may be a bracket or two rods or a similar device) which is welded to the tank 80. Electrode wire 86 is fed through insulating bushing 88 (which for kraft liquor is preferably "Teflon" as mentioned above) into the pipeline 82 and longitudinally retained under stress by the insulating bushing 88 which incorporates a set screw 90. Alternatively, retaining bushes 92, 94 rigidly fixed to electrode wire 86 in any convenient way may be used instead of set screw 90.

Figure 10:
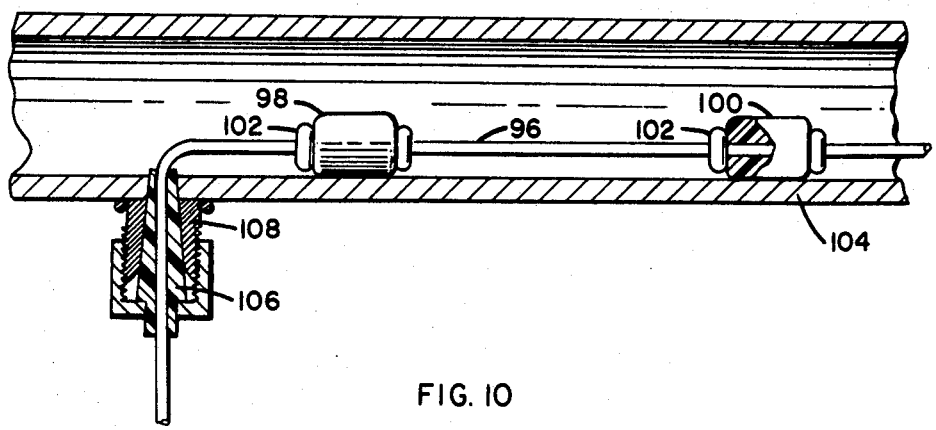
FIG. 10 illustrates an embodiment suitable for a relatively small diameter pipe, and for pipes that may at least sometimes be only partially filled.

This arrangement for anodic or cathodic protection of pipelines provides the best conditions of protection for pipelines, particularly for those of large diameters which require support for wires only at long distances. Preferably for those of small diameter, a simplified arrangement is applicable, as shown in FIG. 10 which represents another embodiment of the invention. It consists of a stiff wire 96 supported by a series of insulators 98, 100 longitudinally retained by local radial protrusions 102. Thus metallic contact with the pipeline 104 is prevented. The current is supplied from below through an insulator 106, such as "Teflon," which is compressed in a half nipple 108. This simplified embodiment of the invention is applicable without special precautions only under conditions which do not favour crevice corrosion. It is preferable to sinter or otherwise fasten the insulators 98, 100 to the wire 96 to inhibit the possibility of crevice corrosion. This embodiment provides protection even if the pipeline is filled to less than 50 percent and can be used to protect pipelines which for most of their run are inaccessible.

Figure 2:
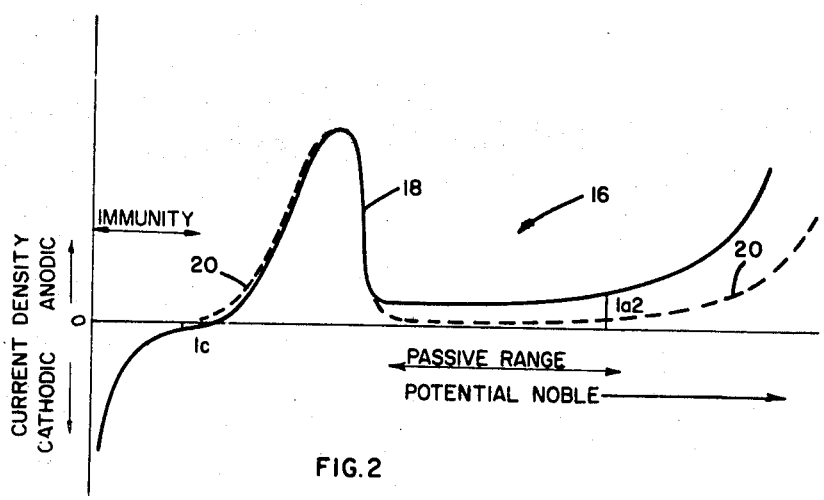
FIG. 2 is the anodic dissolution curve and polarization curve of iron in white liquor without polysulphide.

The protection of the whole length of the filled pipeline at the potential of optimum effect is attained by applying between anodes and cathodes the potential difference derived from FIGS. 1 and 2 as outlined above. Any potential drop in the current supply, in the extended electrode and in the electrolyte has to be added to this potential difference. In order to limit the potential drop in the wire electrode to a permissible value, the current has to be supplied in the electrode at feed points a limited distance apart. The potential drop in the extended wire is about proportional to the square of the distance between feed points. The current to be supplied to pipeline and electrode are derived from polarization curves when the dimensions of the pipeline are known.

While there has been shown and described what is at present considered the preferred embodiments of the invention, it will be obvious to those skilled in the art that various changes and modifications may be made therein without departing from the invention as defined by the appended claims.

I claim:

1. A protected assembly for conveying a corroding liquid comprising, an elongated circular section pipe having two straight portions and a curved portion therebetween, a first and second half nipple attached to the pipe circumference on the outer part of the curved portion each nipple being substantially in alignment with the longitudinal axis of each straight portion, an insulating bushing member closing the outer end of each half nipple, a first and second wire passing through the insulating bushing of the first and second nipples respectively and extending longitudinally along the length of each straight portion, a third and fourth half nipple attached to the pipe circumference, one on each straight portion adjacent the outer part of the curved portion, the third half being tangential to the curved pipe portion at one end and the fourth being normal to the pipe at the other end, an insulating bushing member closing the outer end of each of the third and fourth half nipples, a support member passing through the fourth nipple and terminating in a ring surrounding one of said longitudinal wires, and a third wire having a straight portion between the third half nipple and one longitudinal wire and a curved portion extending between the two longitudinal wires, the curved portion being anchored at said ring surrounding said logitudinal wire.

2. A protected assembly as claimed in claim 1 in which the third wire is supported between the straight portion and the curved portion by a second ring surrounding the other longitudinal wire.

3. A protected assembly for conveying a corroding liquid comprising, an elongated circular section pipe of a metal normally corrosible by the liquid and terminating in an assembly which does not permit traversal by wire, a half nipple attached to the pipe circumference and extending radially outwardly therefrom, an insulating bushing member closing the outer end of said half nipple, a supporting bar passing through the insulating bushing, a tube section rigidly connected to the supporting bar and having its longitudinal axis parallel to that of the pipe, a rod supported by said tube section in cantilever and having the unsupported end adjacent the terminating assembly and means for applying a direct current potential between the pipe and the rod, the potential being such as to inhibit corrosion of both pipe and rod.

4. A protected assembly as claimed in claim 3 and further comprising a second half nipple attached to the pipe circumference and extending outwardly therefrom, an insulating bushing member closing the outer end of the second half nipple, a supporting bar passing through the bushing, a tube section rigidly connected to the supporting bar and having its longitudinal axis parallel to that of the pipe, third and fourth half nipples each extending outwardly from the pipe circumference and inclined away from each other, an insulating bushing member closing the outer end of the third and fourth half nipples, the third and fourth half nipples being located respectively between the first half nipple and the end of the pipe and the second half nipple and the other end of the pipe, and a wire passing successively through the insulating bushing member of the third half nipple, the tube sections of the first and second half nipple units and the bushing member of the fourth half nipple.

5. A protected assembly for conveying a corroding liquid comprising an elongated circular section pipe of a metal normally corrosible by the liquid and terminating at a flat wall of a tank forming a flange for said pipe, a bridge within the tank and over the end of the pipe, a half nipple attached to said bridge, a cap cooperating with said half nipple, an insulating bushing trapped between said cap and said nipple, the bushing axis being aligned with the longitudinal axis of the pipe, a conducting wire passing through the bushing and along the length of the pipe, and means for applying a direct current potential between the pipe and the wire, the potential being such as to inhibit corrosion of both the pipe and the wire.

6. A protected assembly for conveying a corroding liquid comprising, an elongated circular section pipe of a metal normally corrosible by the liquid, a half nipple attached to the pipe circumference and extending outwardly therefrom, a cap cooperating with said half nipple and an insulating bushing trapped between said cap and said half nipple, a conducting member passing through the insulating bushing and insulated thereby from the half nipple and the cap, the conducting member being anchored by the bushing and being of a faired cross section so as to reduce the pressure head losses consequent upon rapid or turbulent flow, a wire supported within the pipe by the conducting member in electrical connection therewith extending substantially the length of the pipe, and means for applying a direct current potential between the pipe and the wire, the potential being such as to inhibit corrosion of both pipe and wire.

7. A protected assembly for conveying corroding liquid comprising, an elongated circular section pipe of a metal normally corrosible by the liquid, a half nipple attached to the pipe circumference and extending outwardly therefrom, a cap cooperating with said half nipple and an insulating bushing trapped between said cap and said nipple, an elongated conducting member passing through the insulating bushing and insulated thereby from the half nipple and the cap, the conducting member extending inwardly along substantially the whole length of the interior of the pipe, a series of insulators sintered to the conducting member so as to inhibit crevice corrosion, the insulators being located at predetermined spacings on the interior of the pipe so as to prevent contact between the conducting member and the pipe, and means for applying a direct current potential between the pipe and the elongated conducting member, the potential being such as to inhibit corrosion of the pipe and conducting member.

References Cited
UNITED STATES PATENTS

| | | | |
|---|---|---|---|
| 1,788,485 | 1/1931 | Gunderson | 204—196 |
| 2,816,069 | 12/1957 | Andrus | 204—196 |
| 3,133,873 | 5/1964 | Miller et al. | 204—196 |
| 3,476,675 | 11/1969 | Colvin et al. | 204—196 |
| 2,193,667 | 3/1940 | Bary | 204—196 |
| 3,009,865 | 11/1961 | Mueller et al. | 204—147 |
| 3,069,336 | 12/1962 | Waite et al. | 204—196 |
| 3,354,061 | 11/1967 | Foroulis | 204—147 |
| 3,409,530 | 11/1968 | Locke et al. | 204—147 |

FOREIGN PATENTS

| | | | |
|---|---|---|---|
| 22,643 | 2/1962 | Germany | 204—196 |

TA-HSUNG TUNG, Primary Examiner

U.S. Cl. X.R.

204—147, 286, 297